United States Patent [19]

Yen et al.

[11] Patent Number: 5,572,698
[45] Date of Patent: Nov. 5, 1996

[54] SYSTEM AND METHOD FOR ALLOCATING MEMORY RESOURCES WHERE THE CATEGORY OF A MEMORY RESOURCE DETERMINES WHERE ON A CIRCULAR STACK A POINTER TO THE MEMORY RESOURCE IS PLACED

[75] Inventors: Hsiang C. Yen, Cupertino; Vasudha N. Bhaskara, Milpitas, both of Calif.

[73] Assignee: Rolm Company, Santa Clara, Calif.

[21] Appl. No.: 228,989

[22] Filed: Apr. 18, 1994

[51] Int. Cl.[6] .................................................. G06F 12/00
[52] U.S. Cl. ................ 395/437; 395/497.01; 364/933.6; 364/247.7
[58] Field of Search ........................... 364/200 MS File, 364/900 MS File, 933.6, 247.7; 395/425, 600, 437, 497.01, 421.09, 200.21, 876, 877

[56] References Cited

U.S. PATENT DOCUMENTS

| | | | |
|---|---|---|---|
| 4,821,170 | 4/1989 | Bernick et al. | 395/275 |
| 5,012,425 | 4/1991 | Brown | 364/464.02 |
| 5,247,626 | 9/1993 | Firoozmand | 395/250 |
| 5,317,720 | 5/1994 | Stamm et al. | 395/425 |
| 5,361,372 | 11/1994 | Rege et al. | 395/800 |

Primary Examiner—Matthew M. Kim

[57] ABSTRACT

A system and method for flexibly and efficiently allowing multiple categories of data to be managed using a circular stack containing pointers pointing to memory resources within a memory resource area. The pointers to these memory resources can be obtained sequentially only from a first part of the circular stack, but can be placed into the circular stack at different locations depending upon the characterization of the memory resources that the pointers are associated with. The system and method is used, for example, within a private branch exchange (PBX).

10 Claims, 10 Drawing Sheets

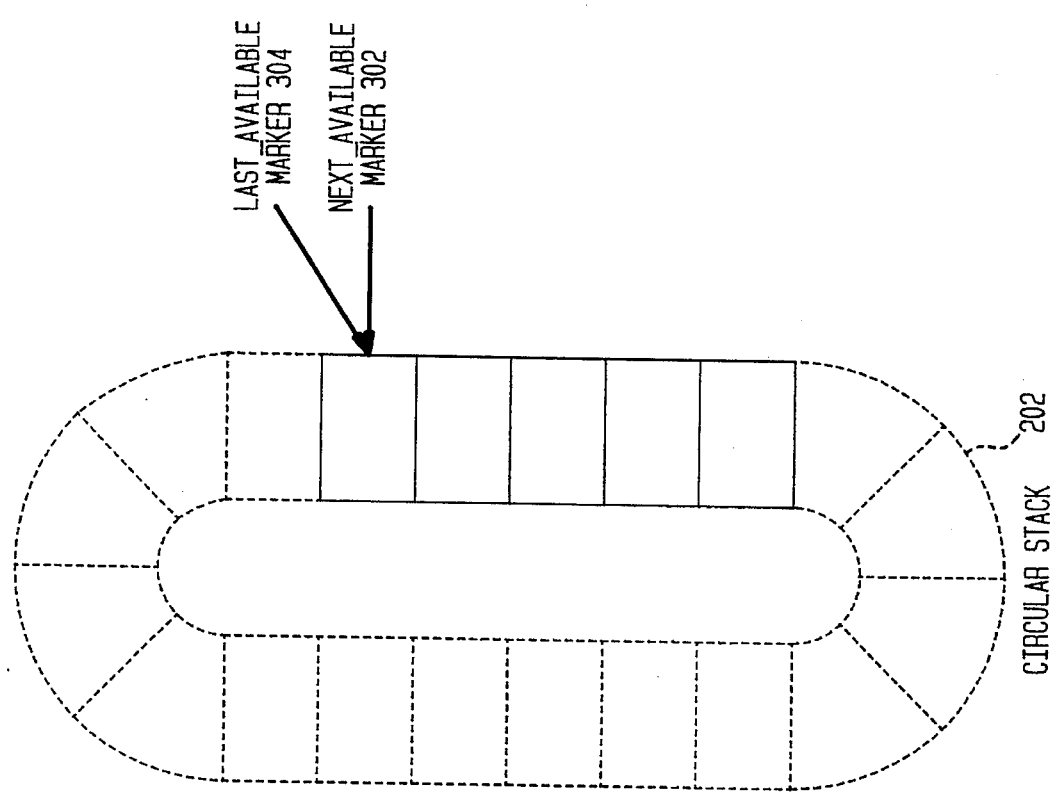
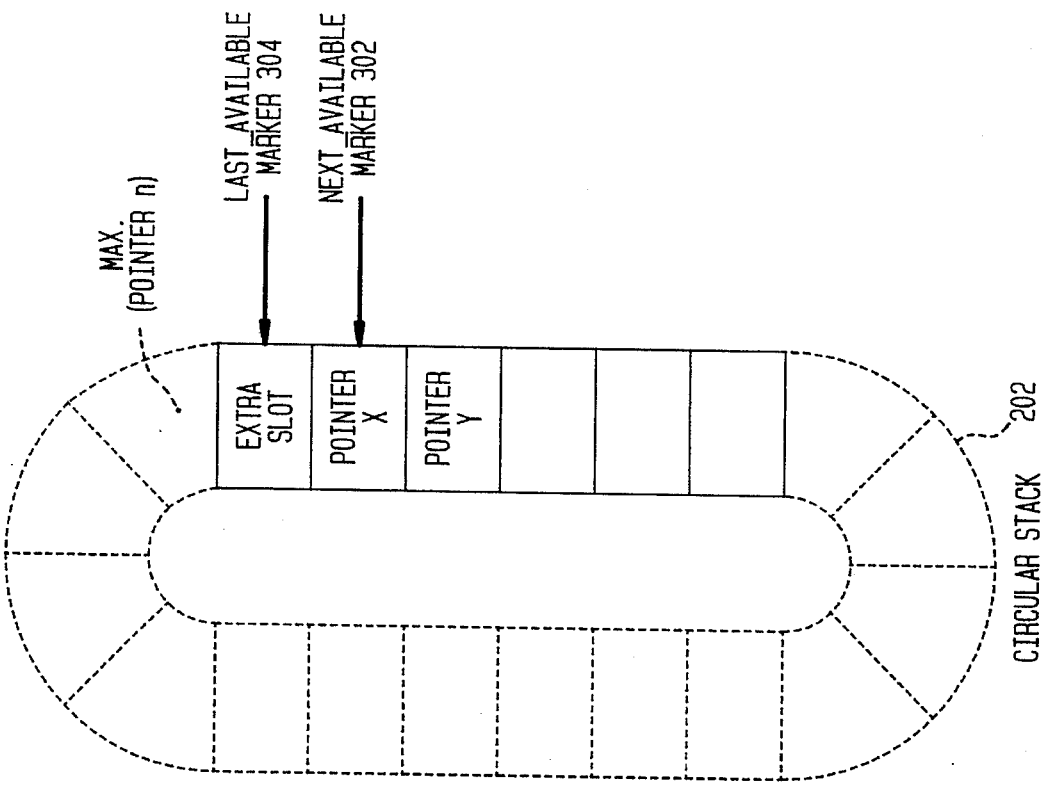

AFTER

BEFORE

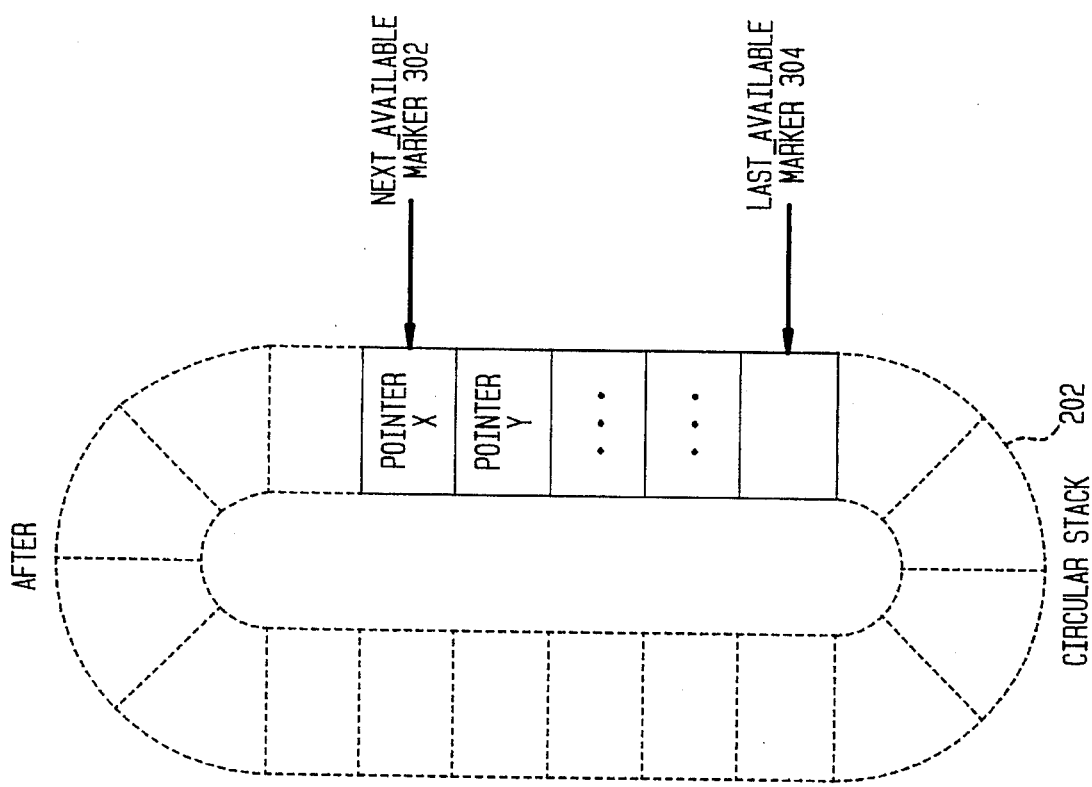
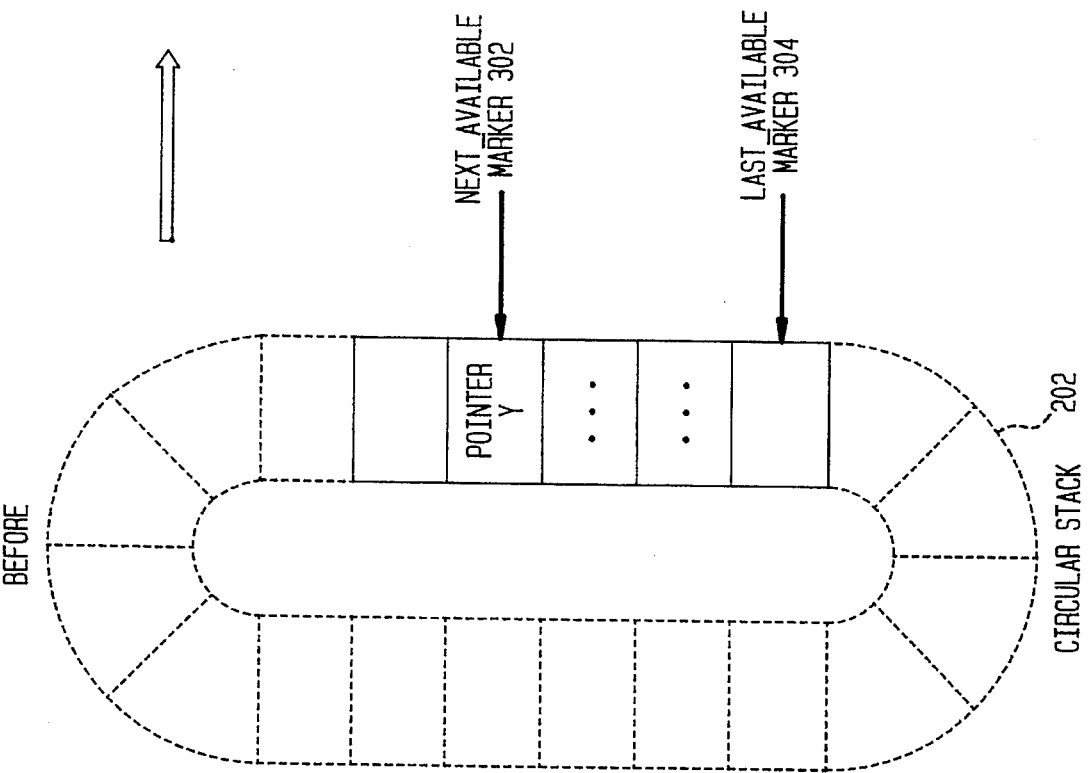

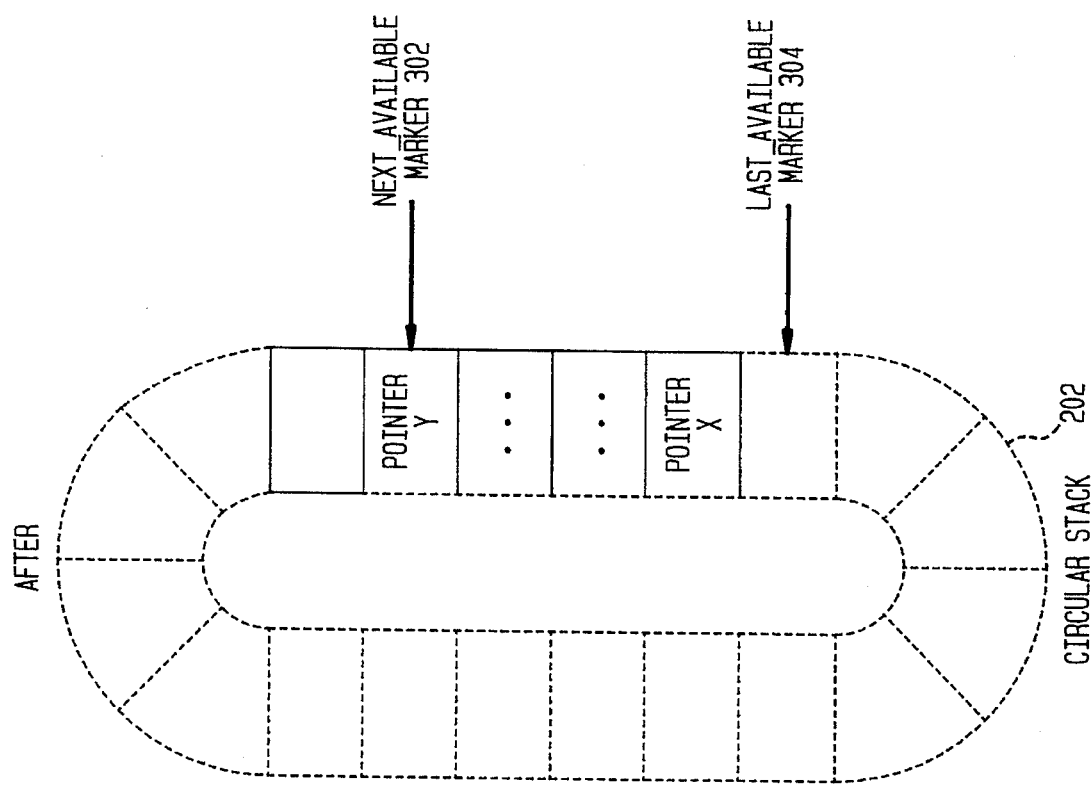
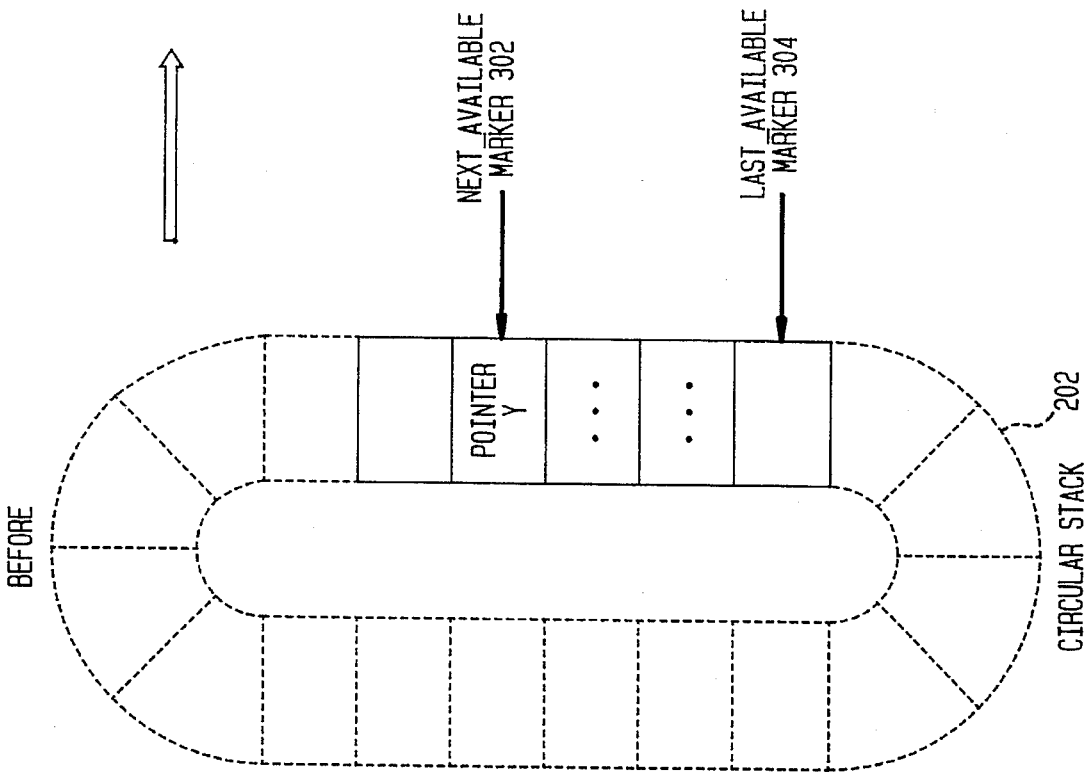

SYSTEM AND METHOD FOR ALLOCATING MEMORY RESOURCES WHERE THE CATEGORY OF A MEMORY RESOURCE DETERMINES WHERE ON A CIRCULAR STACK A POINTER TO THE MEMORY RESOURCE IS PLACED

BACKGROUND OF THE INVENTION

1. Field of the Invention

This invention relates to a memory management system and method for categorizing memory resources depending upon whether they belong to a first or a second category. More specifically, the present invention relates to a system and method for accessing pointers pointing to memory resources to be utilized, and for storing those pointers at one of two designated areas depending upon the category of the pointers and/or the contents of the memory resources that the pointers point to.

2. Related Art

Since the advent of computer science, various techniques for managing and arranging data have been devised. Two notable examples of such techniques are the stack and the queue. In a stack, data (which can represent, e.g., a memory address) is "pushed" (i.e., stored) into some memory resource (typically comprising one or more physical memory locations) such that when data is subsequently requested from these memory resources, the last unit of data to be pushed is then "popped" (i.e., read). Thus, data is both pushed and popped only at one end (i.e., the "top") of the stack so that the Last one In is the First one Out (LIFO).

In a queue, however, the units of data are stored sequentially, so that new data is stored at one end of this sequence, while data that are subsequently requested are read and removed from the other end. In this way, the First one In is the First one Out (FIFO). Since the memory resources comprising the queue are progressively and sequentially used and data is written to and taken from the queue, it is often the case that the queue will be made "circular." This means that each memory resource is uniquely linked to two other memory resources, and that all of the memory resources used for the queue are linked together in a circular fashion so that memory resources can be used again and again.

In many ways, queues and stacks serve as excellent data management techniques, since they are simple, quick and easy to use. However, they can often be inflexible and inadequate if more than one category of data needs to be stored. For example, assume it is the policy of an airline to give first class seats to its economy class passengers in the event that 1) the airline overbooked economy class and 2) there are no more economy class seats available. Assume further that both first class and economy seats may free-up as people cancel or don't show up during the pre-flight time period.

Initially, data representing economy class and first class seats can be arranged in a queue or stack so that economy class seats will be the first ones out, with the first class seats placed behind them. That way, only when the quantity of economy class seats are used up will the first class seats be taken from the queue or stack. However, as both first class and economy seats free-up, it will be desired to return them to the queue or stack. Using a conventional queue or stack, there is no way to put each category of seat in an appropriate place, since a stack and a queue only allow data to be written at the beginning or the end, respectively, of their respective storage areas.

It is true that for the above-mentioned example, multiple queues and/or stacks can be used to achieve the desired result. However, additional data management would be required to maintain such an arrangement.

Thus, what is needed is a system and method for flexibly and efficiently allowing multiple categories of data to be managed.

SUMMARY OF THE INVENTION

The present invention solves the problems described above by providing a system and method for flexibly and efficiently allowing two or more categories of data to be managed using a circular stack containing pointers pointing to memory resources within a memory resource area. The pointers to these memory resources can be obtained sequentially only from a first part of the circular stack, but can be placed into the circular stack at different locations depending upon the characterization of the memory resources that the pointers are associated with. In this way, memory resources categorized in any number of ways (e.g., according to their memory address and/or their contents) can have their associated pointers grouped according to these classifications. Thus, the need for multiple conventional stacks and/or queues is obviated.

Various embodiments of the present invention contemplate use in a computer environment where requests are made to the present invention for memory resources. A particular application envisioned concerns a private branch exchange (PBX) environment. In that situation, the pointers to the memory resources are placed onto the circular stack according to the memory address of the memory resource or, more specifically, according to the "page" of memory that the memory resource resides.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which:

FIGS. 3a and 3b are diagrams illustrating the conditions and operation contemplated by various embodiments of the of the present invention when the circular stack has available pointers and when it is empty.

FIGS. 6a and 6b illustrate the conditions and operations contemplated by various embodiments of the present invention where the pointer of a memory resource having a first characterization is placed onto a circular stack.

FIGS. 7a and 7b illustrate the conditions and operations contemplated embodiments of the present invention where a pointer pointing to a resource having a second characterization is placed onto the circular stack.

DETAILED DESCRIPTION

This invention relates to a memory management system and method for categorizing memory resources depending upon whether they belong to a first or a second category. More specifically, the present invention relates to a system and method for accessing pointers pointing to memory resources to be utilized, and for storing those pointers at one of two designated areas depending upon the category of the pointers and/or the contents of the memory resources that the pointers point to.

Figure 1:
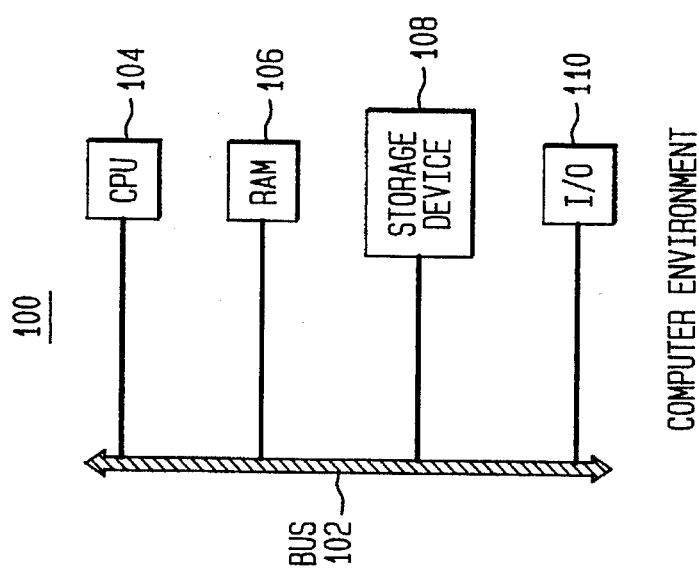
FIG. 1 is a diagram of a computer environment (or portion thereof) contemplated for use with the present invention.

A computer environment 100 (in whole or as part of a larger one) contemplated for use with various embodiments of the present invention is illustrated by FIG. 1. Referring to FIG. 1, a bus 102 is shown attached to a central processing unit (CPU) 104. The CPU 104 could be any number of different types of processors, including, e.g., complex instruction set computer (CISC) processors from Intel (e.g., 80486 or Pentium) or Motorola (e.g., 68000 series), reduced instruction set computer (RISC) processors such as those from Digital Equipment Corporation (e.g., Alpha series), etc. The bus 102 could be a main bus of a computer system or a local bus.

Also attached to bus 102 is a random access memory (RAM) 106. This RAM 106 could be of any number of different types, including, e.g., dynamic RAM (DRAM), static RAM (SRAM) and Flash Memory.

Storage device 108 can be any type of mass storage device based on, for example, magnetic or optical storage, and I/O device 110 could be any standard I/O-type device such as printers, keyboards, etc. In general, environment 100 can be any type of device, such as a personal computer, multiple processor or networked computer environment or a dedicated environment such as a private branch exchange (PBX).

Figure 2:
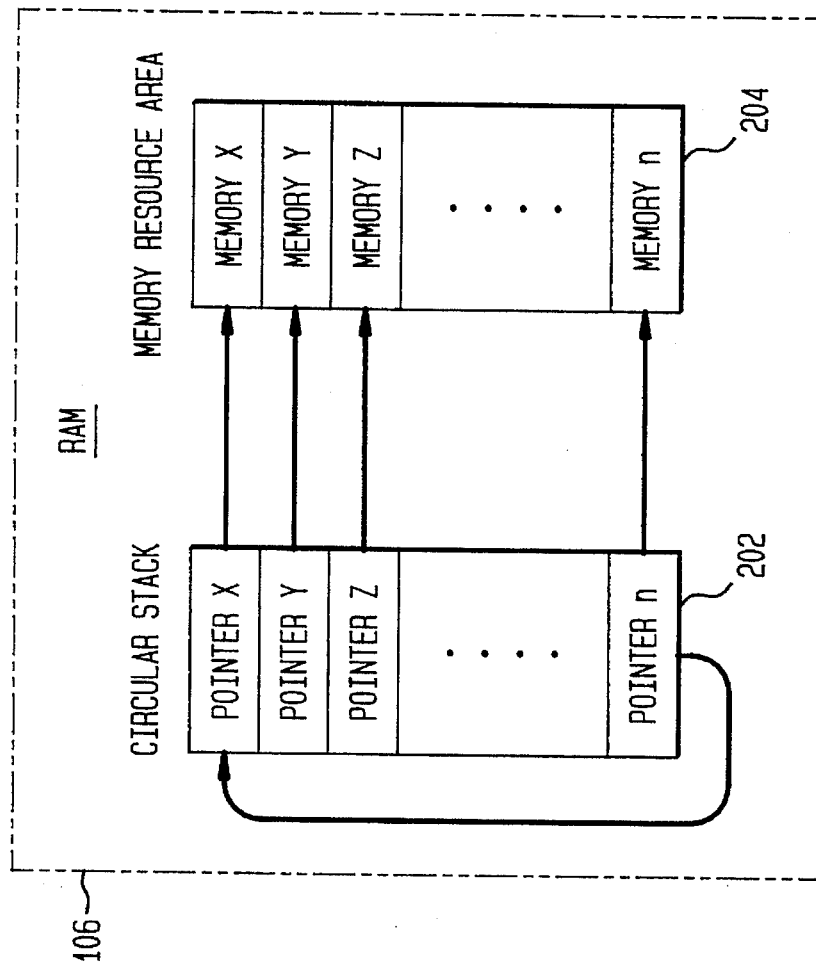
FIG. 2 is a diagram illustrating a configuration for memory resources and associated pointers within RAM as contemplated by embodiments of the present invention.

FIG. 2 illustrates the memory arrangement and management contemplated by embodiments of the present invention within RAM 106. Specifically, a memory resource area 204 is set aside as available resources to be utilized by some requesting entity (not shown) of computer environment 100. Each memory resource (designated as memory X, memory Y, etc.) comprises one or more physical memory locations within RAM 106. Associated with the memory resources 204 is a circular stack 202. This circular stack 202 contains pointers (e.g., memory addresses) associated with each memory resource in the memory resource area 204. Each of these pointers X, Y, . . . n reside in a physical stack location in RAM 106.

Each of the stack locations in which a pointer resides is uniquely linked implicitly (e.g., sequentially) or explicitly (e.g., using pointers) to two other stack locations in a "circular" fashion, thus comprising a circular stack. For example, the stack location of pointer Y is linked to the stack locations of both pointers X and Z, while the stack location of pointer X is linked to both the stack locations of pointer Y and pointer n. In this way, for example, if it were desired to place a pointer in the stack location after pointer n, the stack location used would be the one in which pointer X is shown to reside. Thus, assuming that this stack location were empty (rather than containing Memory X), the pointer would be placed in that stack location, thus indicating the circularity of the circular stack 202.

A very general discussion of the operation of the present invention will now be set forth. Specifically, the operation begins when some requesting entity in the computer environment 100 requests a memory resource. This request could be either for the purpose of subsequently storing data in the memory resource or utilizing data that already resides in it. The pointer on circular stack 202 corresponding to the next available memory resource is taken from the circular stack 202 and given over to the requesting entity. When the requesting entity has completed using the resource, the pointer is placed onto the circular stack 202. Details of this will be discussed further below.

FIGS. 3–7 illustrate various embodiments and describe various concepts contemplated by the present invention. Referring first to FIG. 3a, a circular stack 202 as described in FIG. 2 is shown. Within the circular stack 202 are pointers X, Y, . . . n, each of which points to some memory resource. A "next available marker" 302 points to pointer X, indicating that it is the next pointer that would be obtained (and removed from the circular stack 202) upon a request for a memory resource. Once pointer X is obtained by a requesting entity, next available marker 302 would be updated so as to point to pointer Y.

Memory resources (and their corresponding pointers) can be continually requested as described above until there are no more resources left. This condition would be indicated by there being no more corresponding pointers left in the circular stack 202. Such a condition is shown by FIG. 3b. Here, the next available marker 302 had been continually incremented as the resources were requested until pointer n was finally requested. When that occurred, the next available marker 302 was updated so that it pointed to the same stack location as that pointed to by a last available marker 304, as illustrated by FIG. 3b. This signifies an "out of memory" condition.

It should, of course, be understood that variations of what was described above are also contemplated by embodiments of the present invention. An example of such a variation includes having the next available marker 302 updated to point to the appropriate next available pointer only after a requesting entity makes its request for a memory resource. In other words, the next available marker 302 will point to the appropriate pointer after the request has been issued, but before the appropriate pointer is actually obtained. Once the request is made and the next available marker 302 is updated, only then is the pointer obtained. The same concept can also be applied to the operation of the last available marker 304, and also to situations where an additional pointer is inserted into circular stack 202, as will be described further below.

Figure 4:
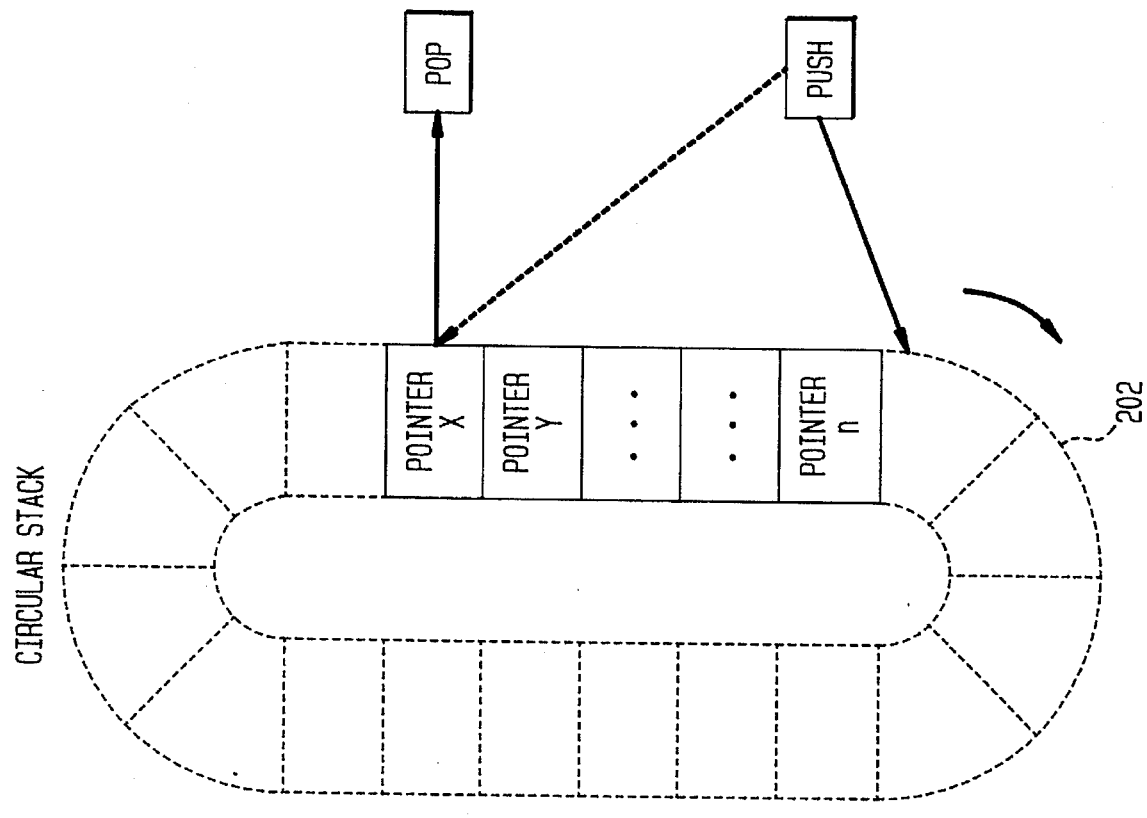
FIG. 4 illustrates the general ability of the present invention to manage data resources having more than one characteristic.

FIG. 4 shows the general way that embodiments of the present invention contemplate allowing two different classes of resources to exist in a single, elegant data management scheme. Specifically, FIG. 4 indicates that a pointer is obtained (popped) from only one part of the circular stack, but that a pointer can be placed (pushed) into the circular stack at two different locations. These concepts are more thoroughly illustrated with regard to the following FIGS. 5–7.

Figure 5B:
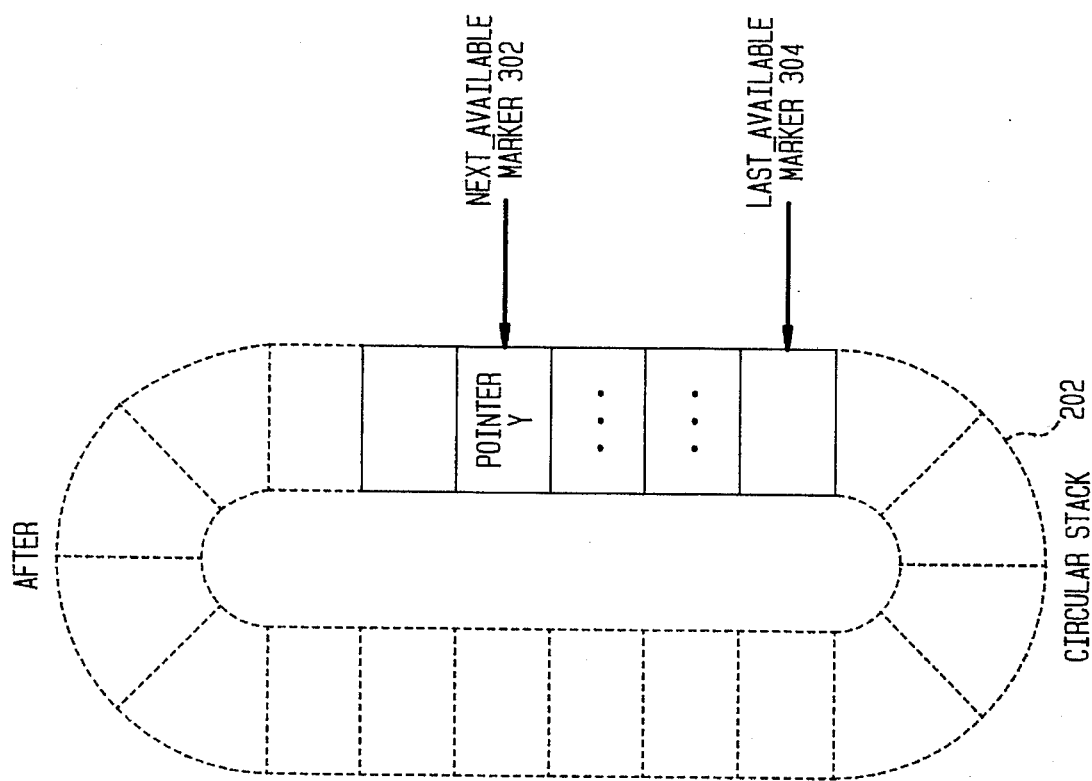
FIGS. 5a and 5b illustrates the conditions and operations contemplated by various embodiments of the present invention when a memory resource is requested by a requesting entity.
Figure 5A:
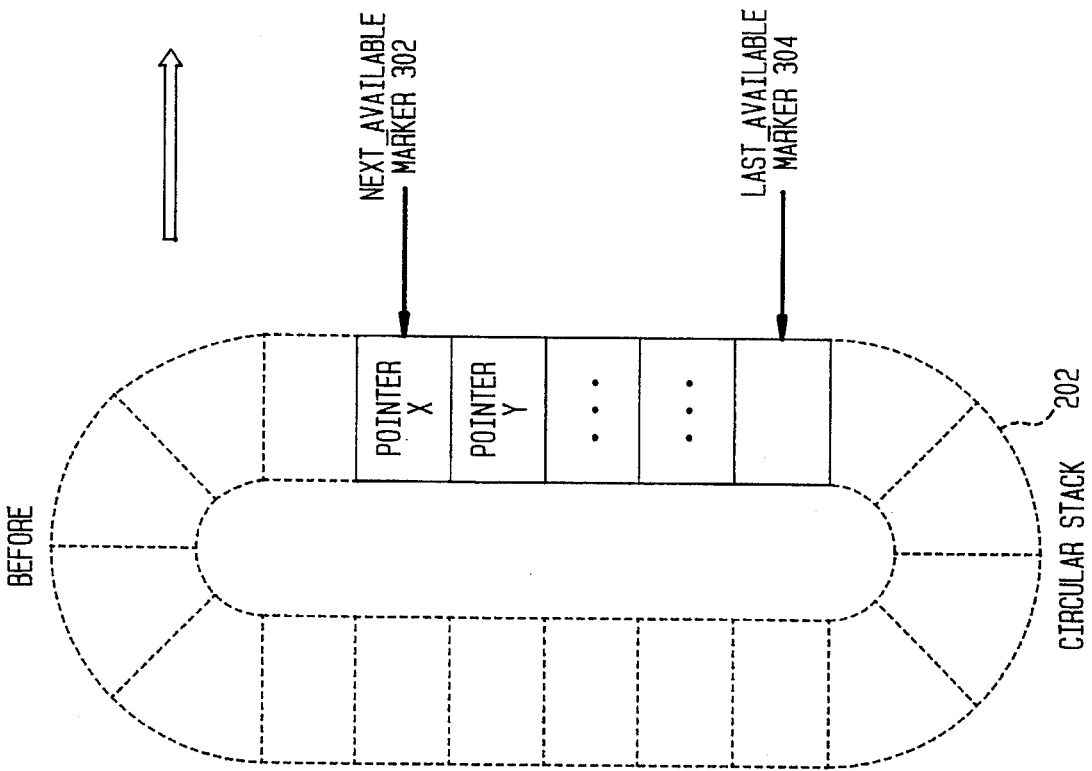

Referring first to FIGS. 5a and 5b, these figures illustrate events that occur within circular stack 202 when a memory resource is requested. Referring first to FIG. 5a, the circular stack 202 illustrates the state of the circular stack 202 prior to a memory resource being requested. As can be seen, next available marker 302 points to pointer X.

Upon the request for a memory resource, the present invention obtains the pointer at the stack location designated by the next available marker 302 (in this case, pointer X), giving it to the requesting resource and removing it from circular stack 202. The next available marker 302 is then incremented to point to the next stack location, in this case, the one containing pointer Y. This condition is shown by FIG. 5b. Note that the position of the last available marker 304 has not changed.

FIGS. 6 and 7 illustrate techniques contemplated by embodiments of the present invention for placing a pointer associated with a memory resource onto circular stack 202. As indicated above, the placement of the additional pointer onto the stack (in response to some type of insertion request from an entity in the computer environment 100) depends upon the characterization of the pointer and/or the contents of the memory resource that it points to. More particularly as contemplated by various embodiments of the present invention, the placement depends upon whether the pointer and/or memory resource contents belong to a first (e.g., "preferred") category or a second category.

Referring first to FIGS. 6a and 6b, these figures illustrate the events that occur when the pointer and/or memory resource contents have been determined to belong to a first category. FIG. 6a illustrates the condition prior to a pointer being placed into circular stack 202, with the next available marker 302 pointing to the stack location having pointer Y in it. Now, when the memory resource is being added, the pointer to that resource (in this example, pointer X) is put onto the "top" of circular stack 202 in the sense that when a memory resource is subsequently requested, the resource now being inserted (i.e., the one pointed to by pointer X) will be obtained. In this sense, pointer X and its corresponding memory resource can be thought of as being "preferred."

From the example given above, pointer X is placed onto circular stack 202 in a position adjacent to pointer Y, as shown by FIG. 6b. The next available marker 302 is also shown as updated to point to pointer X. This illustrates a solution to the situation in the airline ticket example described in the Background section above where a preflight cancellation occurred in economy class. Specifically, the memory resource containing the canceled economy seat would be placed onto the circular stack 202 at the "top" so that it would be the next one obtained when requesting an economy class seat.

FIGS. 7a and 7b illustrate the situation where a pointer and/or memory resource is of a second category, and thus it is not desired that the resource being returned will be the next one obtained from the circular stack 202 upon a subsequent request from a requesting entity. Specifically, FIG. 7a shows the same initial situation as illustrated in FIG. 6a. However, when the memory resource is returned, the pointer to that resource (again, pointer X), is placed onto circular stack 202 at a location indicated by the last available marker 304. This is illustrated by FIG. 7b. Thus, again, using the airline ticket example, if a first class seat were returned, it would be desired to place the pointer to the resource representing that seat at the stack location indicated by the last available marker 304. In this way, that seat would be the last seat obtained by one trying to find seats for persons in economy class.

It should be understood that the illustrations shown in the above-discussed figures depicting the next available and last available markers 302 and 304 respectively are merely by way of example, and that terms such as "incremented" and "decremented" do not necessarily imply that the present invention only contemplates situations where addresses are actually incremented (i.e., a higher address number) or decremented. Rather, these terms are primarily used as references to help explain the concepts of the present invention. This applies equally to other terms and concepts such as "next available marker" and "last available marker."

Figure 8:
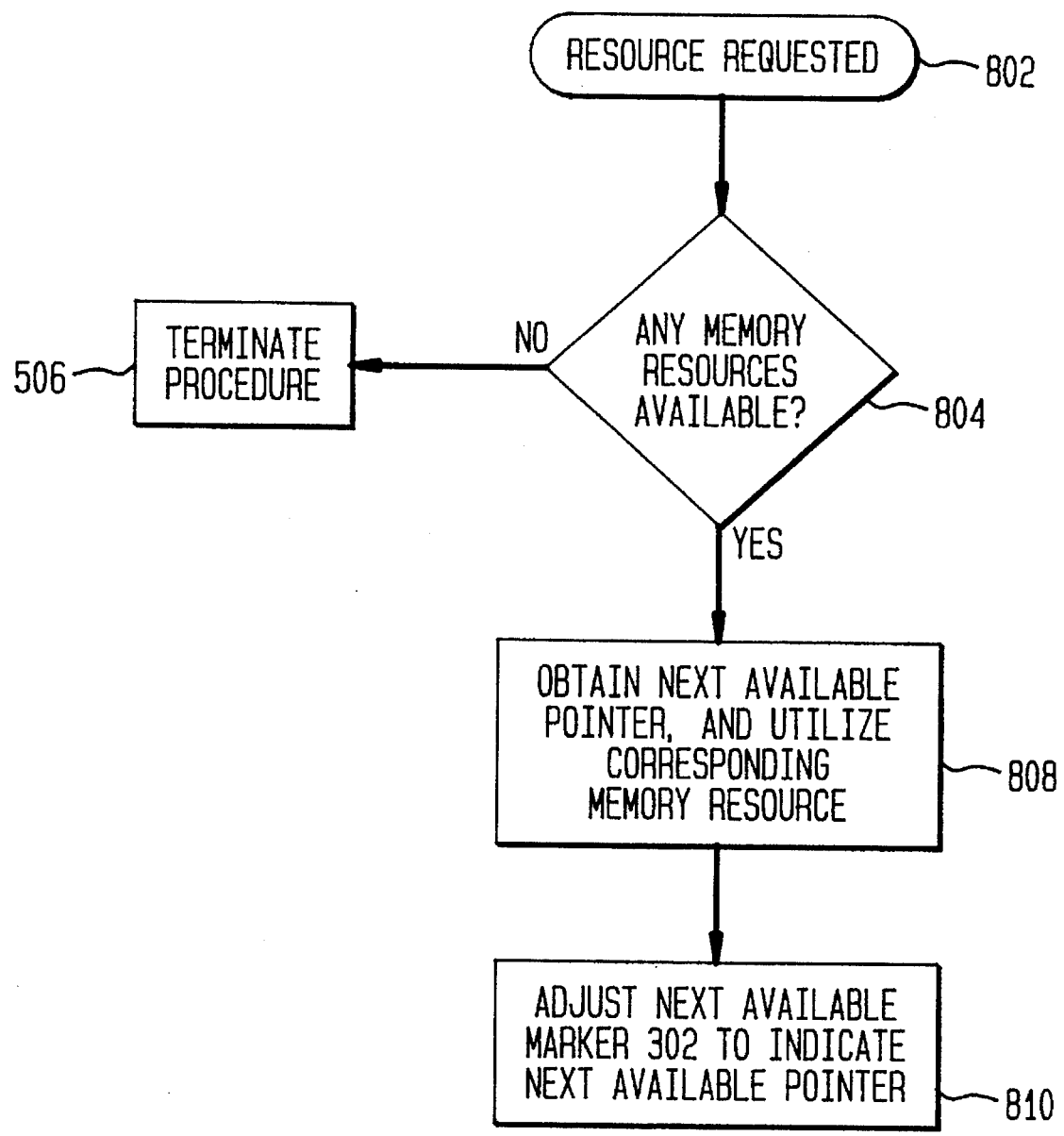
FIG. 8 is a flow diagram of a method contemplated by embodiments of the present invention concerning the removal of a pointer from the circular stack.
Figure 9:
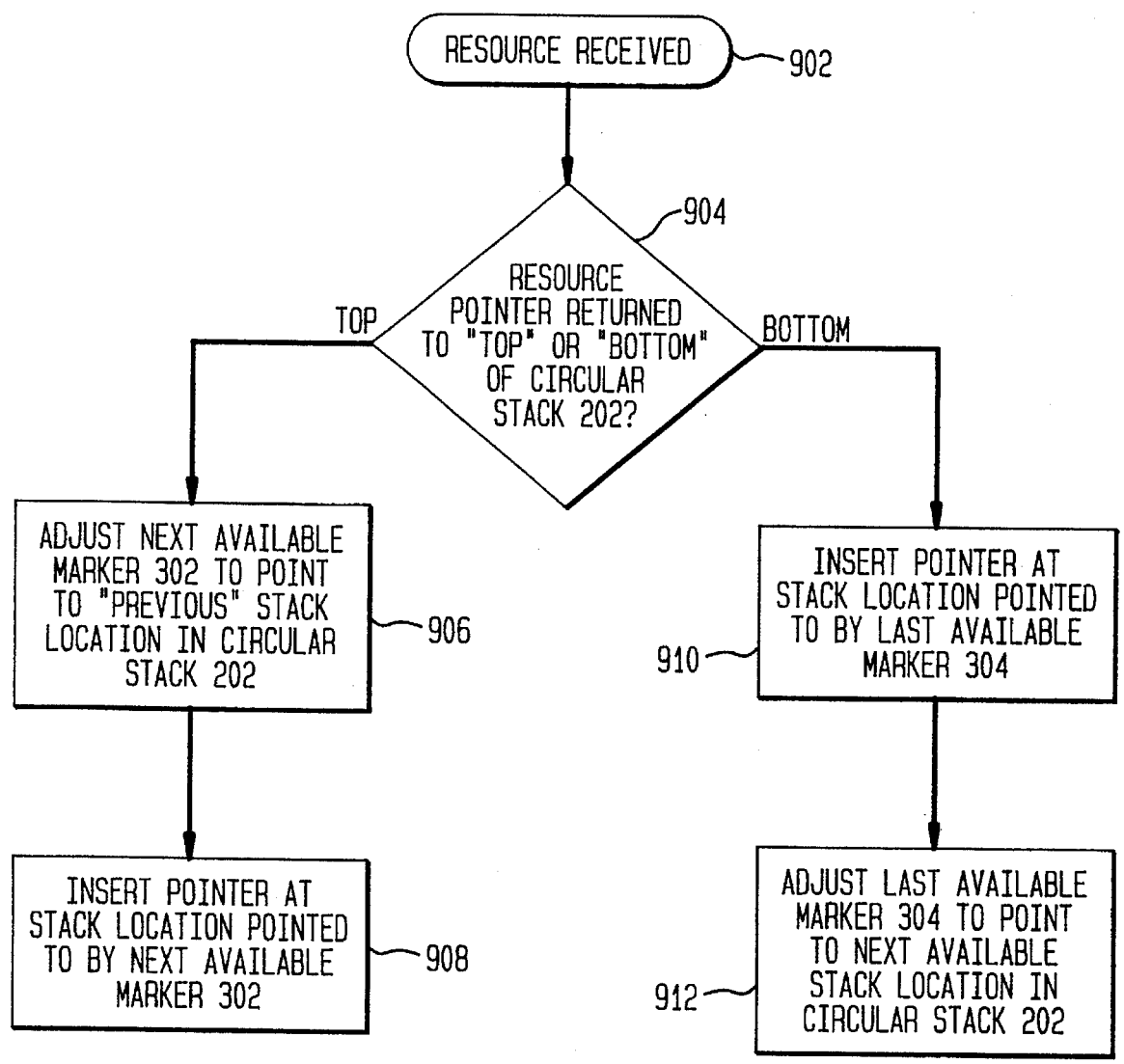
FIG. 9 is a flow diagram of a method contemplated by embodiments of the present invention concerning the addition of a pointer to the circular stack.

Embodiments of a method of operation of the present invention are now described with regard to FIGS. 8 and 9. Referring first to FIG. 8, a memory resource is requested by some requesting entity, as indicated by a block 802. A query is then made whether any memory resources are available, as indicated by a block 804. If not, then the present invention will terminate, which may result in an error condition and notification to a user. This is indicated by a block 806. If a memory resource is available, then the pointer corresponding to the next available memory resource will be obtained, and the memory resource will then be utilized by the requesting entity, as indicated by a block 808. The next available marker 302 will then be adjusted to indicate the stack location containing the next available pointer corresponding to the next available memory resource (if any), as indicated by a block 810.

FIG. 9 illustrates an operation where a resource is placed onto the circular stack 202. Referring now to FIG. 9, an indication that a resource is being received is obtained, as indicated by a block 902. A determination is then made, based upon factors including (but not limited to) the contents of the received memory resource and/or the memory address itself of the memory resource, whether the memory resource belongs in a first category or a second category. Looked at from another perspective, a determination is made whether the pointer pointing to the memory resource should be placed onto the "top" or the "bottom" of circular stack 202, as indicated by decision block 904. If it is determined that the pointer is to go into a stack location at the top of circular stack 202 (indicating that the memory resource belongs to a first category), then the next available marker 302 is adjusted to point to the "previous" stack location in circular stack 202. This is indicated by a block 906. Then, the pointer is inserted at the stack location pointed to by the next available marker 302, as indicated by a block 908.

If, however, the memory resource belongs to a second category and the pointer is to be placed onto the bottom of the circular stack 202, then the pointer is inserted at the stack location pointed to by the last available marker 304, as indicated by a block 910. Then, the last available marker 304 is adjusted to point to the next available stack location in the circular stack, as indicated by a block 912. Again, for FIGS. 8 and 9, it should be understood that adjectives such as "next," "previous," "top," "bottom," etc., are all relative terms used for explanatory purposes, and that the present invention is not limited by them.

Figure 10:
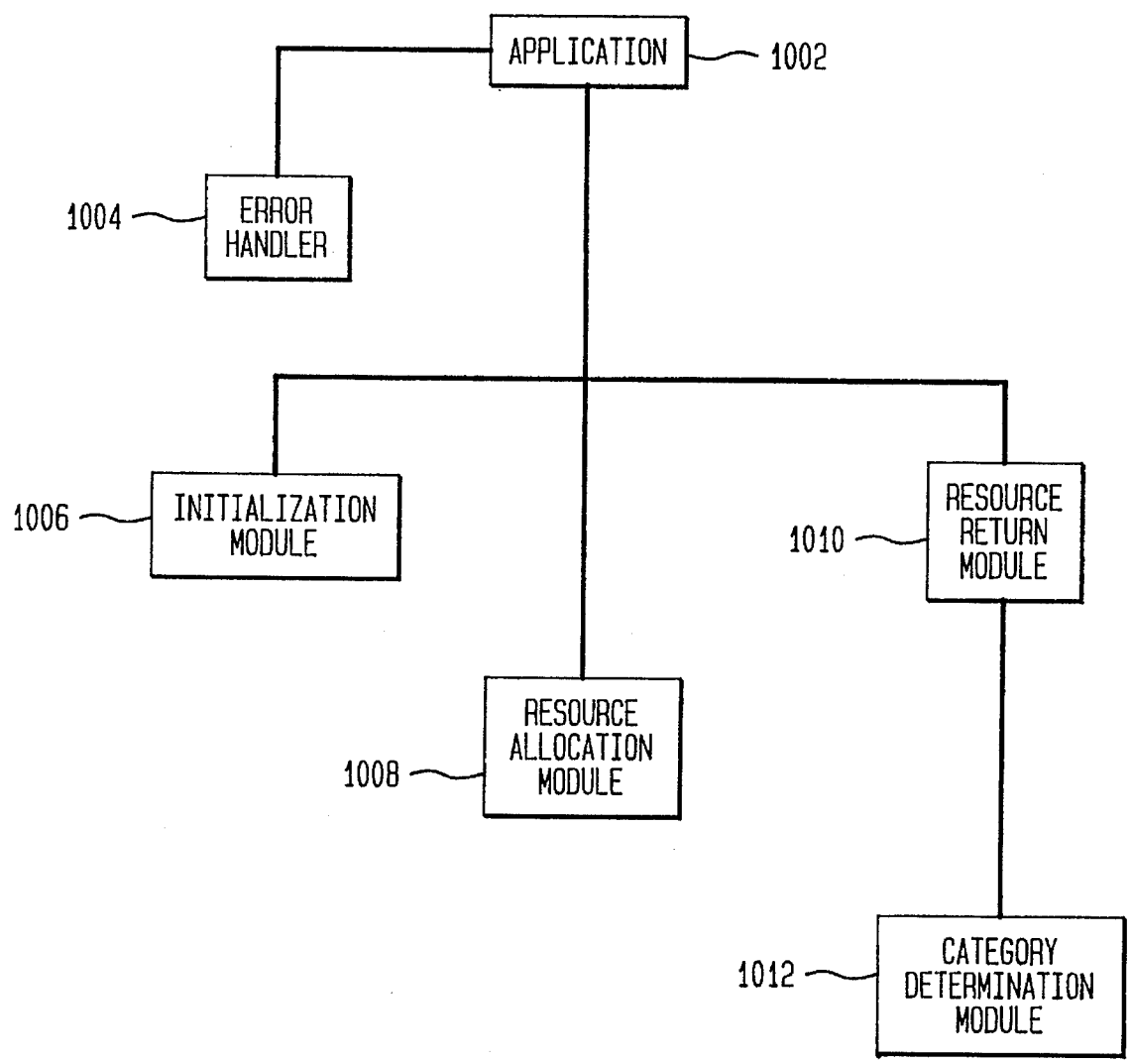
FIG. 10 is a block diagram of a modular structure contemplated by embodiments of the present invention.

A block diagram indicating the functional structure of various embodiments contemplated by the present invention is illustrated in FIG. 10. Referring now to FIG. 10, an application 1002 is shown, which is contemplated to be any application taking advantage of the present invention. This includes the airline reservation example given above, and the PBX example that will be subsequently described below with reference to FIGS. 11 and 12.

Typically, if an error occurs during the use of the application 1002 (i.e., if there are no more physical memory locations 204 to receive a resource from), then an error message will be received and needs to be dealt with in some manner. Typically, an error handler 1004 is provided for this function.

When application 1002 is first initiated, certain values have to be initialized, such as values relating to last available marker 304 and next available marker 302. Consequently, embodiments of the present invention contemplate that an initialization module 1006 is provided.

Further to the general function described by FIG. 8 above, a resource allocation module 1008 is contemplated to be provided. Specifically, this module 1008 has the function of allocating a resource (i.e., the pointer of a physical memory location) upon request of the application 1002.

Further to the general function described by FIG. 9, a resource return module 1010 is also contemplated as provided by embodiments of the present invention. Specifically, this module 1010 has the function of adding a pointer onto the circular stack 202, thus making the corresponding memory resource available for subsequent access by resource allocation module 1008. In addition, a category determination module 1012 decides, based upon some specified criteria, whether the memory resource corresponding to the added pointer belongs to a first category or a second category. The pointer is then placed onto the circular stack 202 accordingly.

The arrangements and designation of the modules in FIG. 10 depicted various embodiments by the present invention. However, it should be understood that the present invention also contemplates other configurations, subdivisions and conglomerations of the modules depicted in FIG. 10. It should further be understood that the embodiments contemplated by the present invention are not limited to that disclosed by FIGS. 8 or 9, and vise versa.

Various embodiments of blocks 1008, 1010 and 1012 of the present invention can be characterized by the following pseudo code:

```
DATA STRUCTURE:

struct Circular_Stack {
unsigned next_avail_ix;/*Index to next available resource in the
circular stack
*/
unsigned last_avail_ix;/*Index to last available resource in the
circular stack
*/
unsigned resource [MAX_RESOURCE+1];/*Group of all the
resources available. Resource       type
can be anything.*/
CODE:

Struct Circular_Stack circular_stack;
unsigned allocate_resource ( )
{
    if   circular_stack.next_avail_ix is not equal to
         circular_stack.last_avail_ix
    {
        new_resource=
        circular_stack.resource[circular_stack.next_avail_ix];
        increment circular_stack.next_avail_ix by 1;
        if the new value of circular_stack.next_avail_ix is
greater than
         MAX_RESOURCE
        {
            circular_stack.next_avail_ix = 0;
        }
        return the new_resource to the caller;
    }
    else
    {
        Inform the caller that there is no free resource
available or return
        the old resource which is already allocated by
overwriting;
    }
    void deallocate_resource(unsigned old_resource)
    {
        if is_it_preferred (old_resource) returns TRUE
        {
            if circular_stack.next_avail_ix = MAX_RESOURCE;
            }
            else
            {
                decrement circular_stack.next_avail_ix by 1;
            }
            circular_stack.resource[next_avail_ix]= old_resource;
        }
        else /*if it is not a preferred resource do the following */
        {
            circular_stack.resource[last_avail_ix] = old_resource;
            if circular_stack.last_avail_ix_is greater than or equal
to
            MAX_RESOURCE
            {
                circular_stack.last_avail_ix = 0
            }
            else
            {
                increment circular_stack.last_avail_ix by 1;
            }
        }
    }
}
BOOL is_it_preferred (unsigned returned_resource)
{ }
```

Of course, it should be understood that the present invention is not limited to the contents or the type of code illustrated above, and any type such as C or Pascal could be used.

Figure 11:
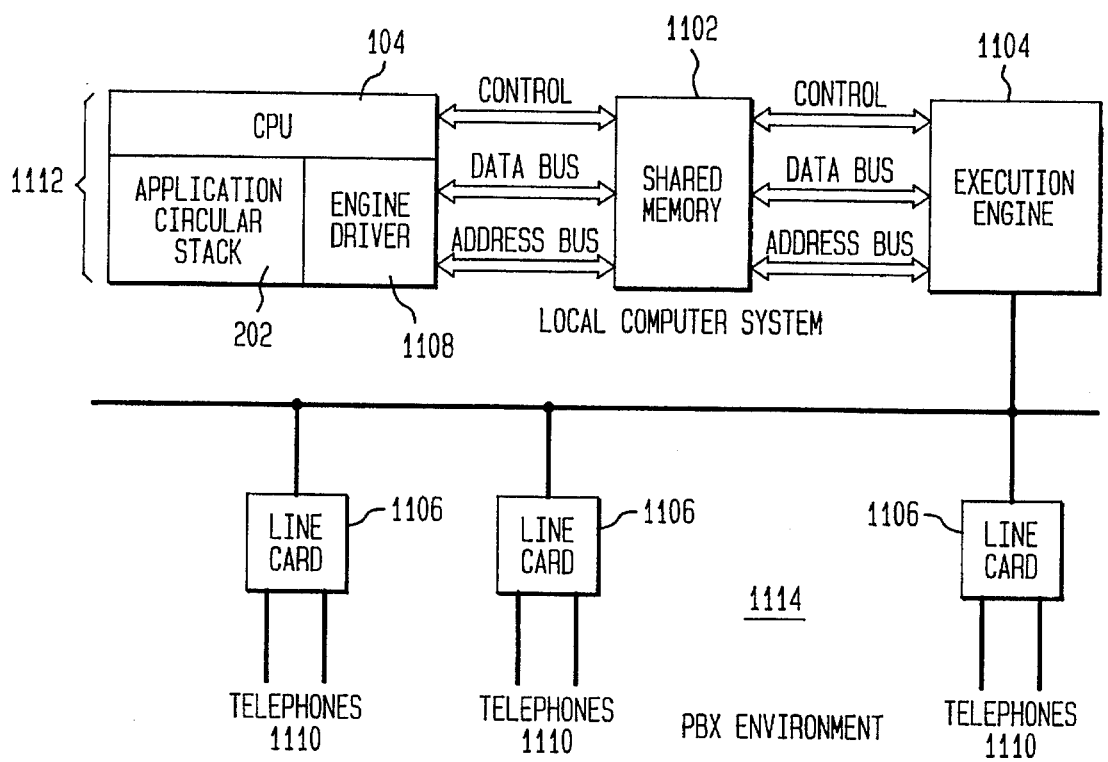
FIG. 11 illustrates a PBX environment of the present invention.

As indicated above, the present invention contemplates use with a variety of new and useful applications (i.e., "requesting entities"). An example discussed above concerned an airline ticket application. Other examples specifically concerning private branch exchange (PBX) applications for use in a PBX environment 1114 are discussed below with regard to FIGS. 11 and 12. Referring first to FIG. 11, a local computer system 1112 is shown having a CPU 104 as well as some type of memory having the circular stack 202 and an engine driver 1108. Also within the memory of local computer system 1112 are the corresponding memory resources.

In the application illustrated by FIG. 11, the circular stack 202 contains pointers to memory resources that are empty, but ready for use by the PBX environment 1114. The memory resources in the PBX environment 1114 may exist on multiple "pages" (i.e., segments) of memory. That is, memory resource area 204 may be distributed amongst multiple pages of memory.

In operation, local computer system 1112 may receive a request (e.g., from a telephone connected to PBX environment 1114) for one or more memory resources into which commands relating to telephone functions need to be placed. The pointers for these memory locations will be popped off of the circular stack 202 and given to the requesting entity. The commands are then placed into the memory resource corresponding to the popped pointers. At designated intervals, the commands are then copied to a shared memory 1102 (e.g., shared by other local computer systems that may be present) by an engine driver 1108. From there, the commands are executed by an execution engine 1104 (which can be any type of processor device dedicated hardware). These commands affect a plurality of telephones 1110 via line cards 1106.

After the commands are copied into shared memory 1102, the requesting entity may continue to utilize the memory resources (i.e., enter additional commands into them) or it may release the resource. If released, the pointers to the memory resources are then returned to circular stack 202. When returning the pointers back to the circular stack 202, it is desirable to insert pointers belonging to the same page of memory adjacent to one another. Thus, in a situation where there are two pages of memory, pointers pointing to memory resources on a first page could be pushed onto the circular stack 202 at the "top," while pointers corresponding to a second page could be pushed onto the "bottom." In a multi-page memory situation where, for example, there are eight pages of memory, pages 1–4 could be pushed onto the top, while pages 5–8 could be pushed onto the bottom.

In returning the pointers back to the circular stack 202 as described above, when the pointers are popped again and the corresponding memory resources are utilized, it is that much more likely that pointers corresponding to the memory resources on the same page will be placed sequentially in shared memory 1102. This then allows as many commands as possible to be placed on the same page of memory during a given time period. This, in turn, allows commands to be copied to shared memory 1102 as efficiently as possible (e.g., by copying as few pages as possible).

Figure 12:
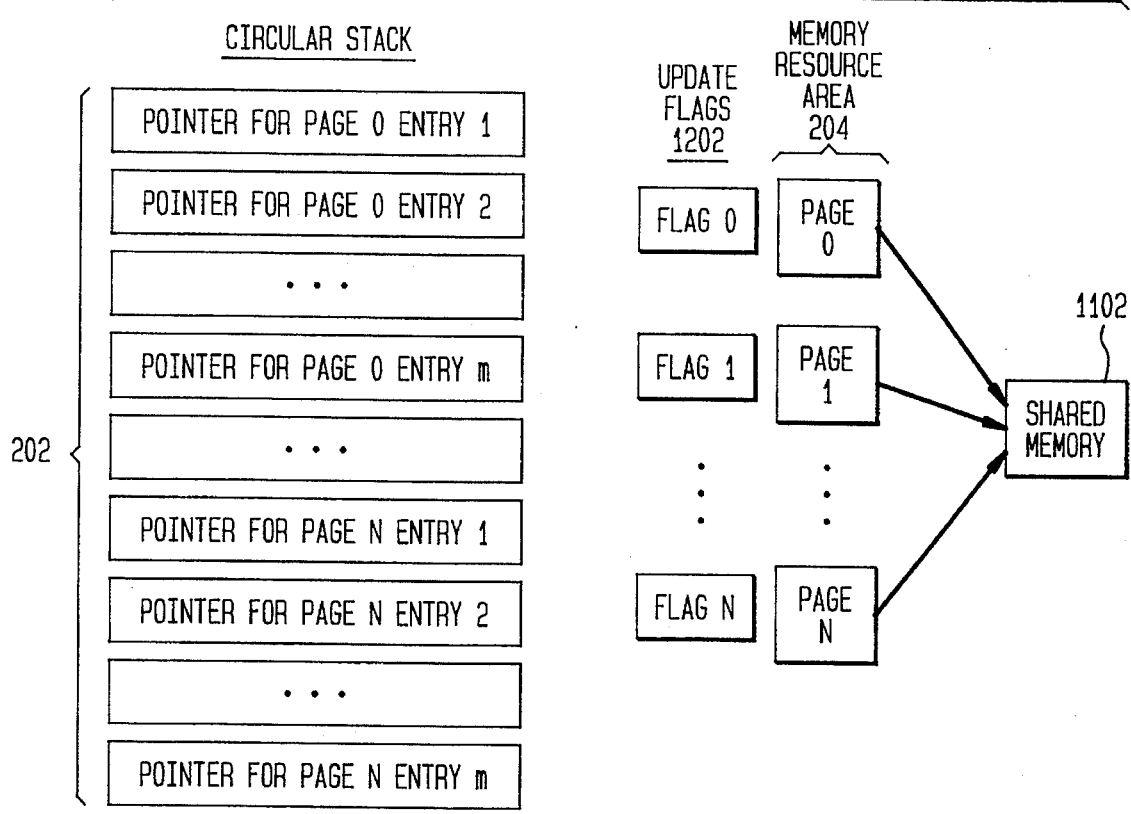
FIG. 12 is a block diagram of a paging scheme of the PBX embodiment as contemplated by various embodiments of the present invention.

FIG. 12 illustrates an example of a paging scheme in the PBX application as contemplated by various embodiments of the present invention. Referring now to FIG. 12, memory resource area 204 is depicted as multiple pages of memory (0 to N). Circular stack 202 contains pointers pointing to the memory resources within these various pages. Update flags 0–N (1202), each corresponding to one of pages 0–N of memory, are each independently set if a flag's corresponding page has a command or other information in it, since only then the would the memory in the page need to be copied to shared memory 1102.

A particular implementation contemplated by FIGS. 11 and 12 is that of the Line Trunk Unit Rolm (LTUR) made by ROLM Company of Santa Clara, Calif. Of course, it should be understood that the present invention contemplates other types of paged memory arrangements having corresponding pointers thereto aside from that which is shown in FIG. 12 or used in the LTUR.

It should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention.

It should also be understood that the present invention is not limited to the embodiments indicated above, and that the examples presented above are merely for the purposes of illustration. The scope of the present invention should therefore be interpreted by the following claims as defined by the forgoing figures and text.

What is claimed is:

1. A system for allocating a plurality of memory resources in a computer environment, comprising:

a plurality of stack locations, wherein each stack location is linked to two other stack locations, and wherein said plurality of stack locations are linked in a circular fashion;

a plurality of pointers, wherein each said pointer is stored in said plurality of stack locations and points to a memory resource;

a next available marker for indicating a next available pointer in a first available stack location in said plurality of stack locations;

a last available marker for indicating a last available pointer in a last available stack location in said plurality of stack locations;

request detection means for detecting a memory resource request from the computer environment;

resource access means, responsive to said request detection means, for obtaining said next available pointer indicated by said next available marker, wherein, upon obtaining said next available pointer, said next available marker is updated such that said next available marker indicates a pointer corresponding to a next available memory resource;

resource placement means for placing an additional pointer into one of said stack locations upon receipt of a placement request, comprising resource categorization means for determining whether the memory resource that said additional pointer points to belongs to a first category or a second category of memory resources;

first category insertion means, responsive to said resource categorization means, for inserting said additional pointer into a stack location indicated by said next available marker when the memory resource that said additional pointer points to belongs to the first category;

second category insertion means, responsive to said resource categorization means, for inserting said additional pointer into a stack location indicated by said last available marker when the memory resource that said additional pointer points to belongs to the second category.

2. The system of claim 1, wherein said next available marker points to said first available stack location prior to receipt of said memory resource request.

3. The system of claim 1, wherein said resource categorization means determines whether the memory resource pointed to by said additional pointer belongs to a first or second category based on a memory address of said memory resource.

4. The system of claim 1, wherein said resource categorization means determines whether the memory resource pointed to by said additional pointer belongs to a first or second category based on contents stored in said memory resource.

5. A method for allocating a plurality of memory resources in a computer environment, wherein the computer environment has a plurality of stack locations linked in a circular fashion, and wherein a plurality of pointers are stored in said plurality of stack locations, each pointer pointing to a memory resource from the plurality of memory resources, the method comprising the steps of:

(1) obtaining, in response to a memory resource request from the computer environment, a next available pointer indicated by a next available marker, wherein, upon obtaining said next available pointer, said next available marker is updated such that said next available marker indicates a pointer corresponding to a next available memory resource;

(2) placing, in response to an insertion request from the computer environment, an additional pointer from the plurality of pointers into one of the stack locations, comprising the substeps of (2)(a) determining whether a first memory resource from the plurality of memory resources that said additional pointer points to belongs to a first category or a second category;

(2)(b) inserting, upon a determination in said substep (2)(a) that the first memory resource belongs to the first category, said additional pointer into a stack location indicated by said next available marker;

(2)(c) inserting, upon a determination in said substep (2)(a) that the first memory resource belongs to the second category, said additional pointer into a stack location indicated by a last available marker.

6. The method of claim 5, wherein said substep (2)(b) includes updating said next available marker after receipt of said insertion request and prior to inserting said additional pointer.

7. The method of claim 6, wherein said substep (2)(a) includes determining whether the first memory resource pointed to by said additional pointer belongs to the first category or to the second category based on a memory address of said first memory resource.

8. The method of claim 6, wherein said substep (2)(a) includes determining whether the first memory resource pointed to by said additional pointer belongs to the first category or to the second category based on contents stored in said first memory resource.

9. A system for allocating a plurality of memory resources, each having an address in a private branch exchange (PBX) environment, comprising:

a local computer system, having a memory resource area comprising two or more memory pages;

a shared memory for receiving one or more commands, to which the PBX environment is responsive, from said local computer system;

said local computer system further comprising a plurality of stack locations, wherein each stack location is uniquely linked to two other stack locations, and wherein said plurality of stack locations are linked in a circular fashion;

a plurality of pointers, wherein each said pointer is stored in said plurality of stack locations and points to a memory resource from the plurality of memory resources;

a next available marker for indicating a next available pointer in a first available stack location in said plurality of stack locations;

a last available marker for indicating a last available pointer in a last available stack location in said plurality of stack locations;

request detection means for detecting a request from the PBX environment for a requested memory resource from the plurality of memory resources;

resource access means, responsive to said request detection means, for obtaining said next available pointer indicated by said next available marker, wherein the PBX environment is given said next available pointer and a first command is placed in a first memory resource from the plurality of memory resources indicated by said next available pointer, and wherein said next available marker is updated such that said next available marker indicates a pointer corresponding to a next available memory resource;

an engine driver for conveying said first command to said shared memory;

release detection means for detecting that a previously obtained memory resource which was previously obtained by the PBX environment, has been released;

resource placement means for placing a released pointer, corresponding to said previously obtained memory resource, into one of said stack locations, said resource placement means comprising resource categorization means for determining whether a first address of said previously obtained memory resource belongs to a first category of memory pages or a second category of memory pages;

first category insertion means, responsive to said resource categorization means, for inserting said released pointer into a stack location indicated by said next available marker when the previously obtained memory resource belongs to the first category of memory pages;

second category insertion means, responsive to said resource categorization means, for inserting said released pointer into a stack location indicated by said last available marker when the previously obtained memory resource belongs to the second category of memory pages.

10. The system of claim 9, wherein said local computer system further comprises update flags for indicating whether any of two or more said memory pages contains said first command, and wherein said engine driver conveys said first command to said shared memory in response to said update flags.

* * * * *